United States Patent Office 3,532,509
Patented Oct. 6, 1970

3,532,509
POTATO COATED SNACK FOOD PRODUCT
Le Roy E. Gronberg, Minneapolis, Minn., assignor to General Mills, Inc., a corporation of Delaware
No Drawing. Filed Dec. 23, 1966, Ser. No. 604,168
Int. Cl. A23l 1/10, 1/12
U.S. Cl. 99—83      4 Claims

ABSTRACT OF THE DISCLOSURE

A deep-fat fried snack food product in the form of a cereal base food piece having finely divided potato particles adhered to the surface thereof.

---

The present invention relates to a novel snack food product and to a process of producing the same.

Snack food products of the type which are customarily eaten between meals, frequently to the accompaniment of beverages, are large volume items. Competition is extremely acute in this area because of the large volume, and numerous attempts have been made to obtain a substantial share of this market through novel and unusual products. There are constant innovations in the field in an attempt to replace some of the more successful products. There is therefore a premium on any product which can command consumer acceptance.

The present invention makes possible a variety of products of this type with a variety of physical as well as flavor characteristics depending on the type of product desired. In addition, there are considerable economies to be effected as compared with comparable products derived from other materials or by other processes.

The product of the present invention is the combination of a base food piece of the snack variety to which has been applied a coating of finely divided potato particles. There is considerable variation possible in the base food pieces as well as in the type and amount of potato particle coating and also in the particular processes by which the end product is made.

The base food piece may be any of the typical snack food base pieces or any other product of a similar nature. It may be in the form of a chip, a tube, a ball, a curl or any of the other familiar snack forms. While generally the base food piece is cereal or farinaceous in nature such as corn, wheat, rice, barley and the like, the present invention is not limited thereto but includes any similar base food piece derived from protein, starch, fiber or combinations thereof, with or without fat and other ingredients. Many of these base pieces are made by forming a dough, either cooked or uncooked, and shaping the dough and finally toasting, baking or deep fat frying the piece to provide the finished product. The base piece may be rather bland in flavor or may be highly flavored by reason of one or more flavoring materials.

According to the present invention, the base food piece is, at some stage in its manufacture, coated with a coating of finely divided potato particles. Any of a wide variety of these materials are available and may be used. By the term "finely divided potato material" or similar terms it is intended to mean particles of potato which have characteristic potato flavor and not to be inclusive of such materials as potato starch which is an essentially pure starch without the characteristic flavor of the potato. The most commonly available forms of potato products which may be used are those commercially available in the dehydrated form frequently used for the preparation of mashed potatoes. These commercially are in the form of granules, flakes or other dehydrated forms. Any of these materails which have been reduced to a degree of fineness suitable for coating may be used in the present invention. In addition to these readily available commercial forms of potato products, it is possible also to use raw potato particles, either in a wet or dried condition. The particular flavor of the potato product may vary, depending upon the particular processing to which it has been subjected but in general they all have a characteristic potato flavor. Generally, the finely divided potato material should be used in the range of from 5 to 50%, preferably 10–25%, by weight based on a dry basis on the finished snack product.

By reason of this use of the finely divided potato product coating, it is possible to make maximum use of the flavor characteristics of the potato product and to use this as a predominant flavor or in combination with other distinctive flavors which have either been introduced into the base food piece, in a coating over the base food piece or incorporated into the finely divided potato product itself. Where it is desired to have a product with a predominantly potato flavor, it is possible to achieve this predominantly potato flavor by reason of a relatively small quantity of potato material superimposed upon a less costly base price. For example, where it is desired to simulate a potato chip, it is possible to produce a relatively bland base piece, such as a rice chip or a corn chip and superimpose a relatively small amount of potato product on the surface and achieve a flavor quite similar to that of a potato chip, the latter of course involving a relatively high priced material.

The variations possible in the invention are evident from the following examples which are to be considered as illustrative only and not as limiting the invention.

EXAMPLE I

The following ingredients were placed in a pressure cooker:

| | Pounds |
|---|---|
| Corn grits | 21 |
| Rice | 4 |
| Sugar | ½ |
| Salt | ¼ |
| Water | 6 |

The pressure cooker was then closed and the mixture cooked for one hour at 20 pounds per square inch pressure in the cooker. The cooked material was then removed from the cooker, cooled to approximately room temperature and then sheeted to about .033 of an inch using one smooth roll and one corrugated roll. The sheeted dough was then cut into pieces about the size of potato chips, which were then dried to about 10% moisture. These chips were then moistened on the surface by a quick dip in water after which dehydrated potato granules were deposited on the surface of the chips. The chips were again dried to about 10% moisture and then deep fat fried at 375 to 400° F. for about 8–12 seconds. The product was similar in appearance to a typical potato chip in that it had curled and buckled to a degree but it had distinct corrugated surface on one side. The product was light yellow in color in areas which were not thoroughly covered with the potato particles and the areas which were so covered with potato particles were somewhat darker with a sort of amber appearance. The product had a distinctive potato flavor even though the potato particles constituted no more than about 20% of the total solids content of the product.

EXAMPLE II

A series of products were made as indicated in the following table. In each instance, a cooked dough was prepared in which the principal cereal or farinaceous ingredients were as indicated in the table. These cooked doughs were then shaped into a variety of shapes. These shapes were then wetted by dipping in water for two to three seconds, shaking on a screen to remove excess water and then coated with the indicated potato ingredient. The enrobed products were then dried, fried and salted as indicated. Each had a good potato flavor in addition to the inherent characteristic flavor of the base product.

| Base product | Potato ingredient | Approximate percent potato on finished chip | $H_2O$ before frying, percent | Fry Temp., °F. | Time, sec. |
|---|---|---|---|---|---|
| Cornmeal, rice | Raw air dried and ground slices | 15-20 | 9-10 | 395 | 14 |
| Corn grits | { Dehydrated potato powder | 20-25 | 11 | 395 | 18 |
|  | { Ground dehydrated mashed potato flakes | 20-25 | 11 | 395 | 18 |
| Cornmeal | Dehydrated mashed potato granules | 15-20 | 10 | 395 | 12 |

Similar tests were run on products which were sprayed with water either on one side or both sides of the piece. This provides a means of controlling the amount of potato adhering to the base piece. All had characteristic potato flavor varying with the amount of potato product employed.

The above examples illustrate a variety of ways in which the present invention may be carried out. The preferred process involves deep fat frying and for this purpose typical conditions involve controlling the moisture of the product prior to frying within the range of 6% to 30%, frying the product at a temperature within the range of 340° F. to 410° F. and for time periods of 5 seconds to 60 seconds. Generally the shorter time periods are employed at the higher temperature. Again the temperature and time can be correlated with the moisture content of the product by frying and with a particular flavor desired in the end product.

In addition to deep fat frying, other ways of cooking or toasting are described. These may include simple oven toasting or cooking either with or without added fat or oil or, as an alternative, fat or oil may be added as a spray or coating following the cooking or toasting operation.

Numerous other modifications of the invention will be apparent without departing from the spirit of the invention as defined in the following claims.

The embodiments of the invention in which an exclusive property or privilege is claimed are defined as follows:

1. A deep fat fried snack food product comprising a cereal base food piece having finely divided potato particles adhered to the surface of said base food piece, said potato particles constituting from about 5 to about 50% by weight of the solids of the snack food product.

2. Product according to claim 1 in which the potato particles constitute from about 10-25% by weight of the solids of the snack food product.

3. Process of making a snack food product which comprises forming a cereal base food piece from a dough, adhering finely divided potato particles to the surface of said base piece and deep fat frying the base food piece and potato particles, said potato particles constituting from about 5-50% by weight of the solids of the snack food product.

4. Process according to claim 3 which includes cooking the ingredients, forming the cereal base food dough, forming said cooked dough into pieces, and moistening said pieces with water before the potato particles are adhered to the surface of said base.

References Cited

UNITED STATES PATENTS

| 3,208,851 | 9/1965 | Antinori et al. | 99—1 |
| 2,469,995 | 5/1949 | Schaul | 99—207 |
| 3,035,918 | 5/1962 | Sorgenti et al. | 99—1 |
| 3,140,183 | 7/1964 | Nack | 99—1 |

OTHER REFERENCES

W. F. Talbert and O. Smith: Potato Processing, Avi Publishing Co., Westport, Conn., 1959, p. 402.

A. LOUIS MONACELL, Primary Examiner

W. A. SIMONS, Assistant Examiner

U.S. Cl. X.R.

99—100